(No Model.)

E. A. SPERRY.
POWER GEARING FOR ELECTRIC OR OTHER MOTORS.

No. 565,936.  Patented Aug. 18, 1896.

Witnesses.
L. P. Abell
M. Nielson.

Inventor.
Elmer A. Sperry.

United States Patent Office.

ELMER A. SPERRY, OF CLEVELAND, OHIO, ASSIGNOR, BY MESNE ASSIGNMENTS, TO THE GENERAL ELECTRIC COMPANY, OF NEW YORK.

POWER-GEARING FOR ELECTRIC OR OTHER MOTORS.

SPECIFICATION forming part of Letters Patent No. 565,936, dated August 18, 1896.

Application filed June 29, 1894. Serial No. 516,053. (No model.)

*To all whom it may concern:*

Be it known that I, ELMER A. SPERRY, a citizen of the United States, residing at Cleveland, in the county of Cuyahoga, State of Ohio, have invented certain new and useful Improvements in Power-Gearing for Electric or other Motors, of which the following is a specification.

My invention relates to power-driving mechanism for cars, and may be used for coupling the revolving parts of the truck or of a motor to the axle or axles of the truck; and it consists in various details of construction of such coupling and equipment whereby yielding, elastic, and slipping actions are obtained, and the coupling may accommodate itself to various differences in position relatively between the axles or between the axle and the motor, whereby also various economies are worked and cheaper construction is obtained, all of which is fully described in the specification and pointed out in the claims forming a part hereof.

Figure 1:
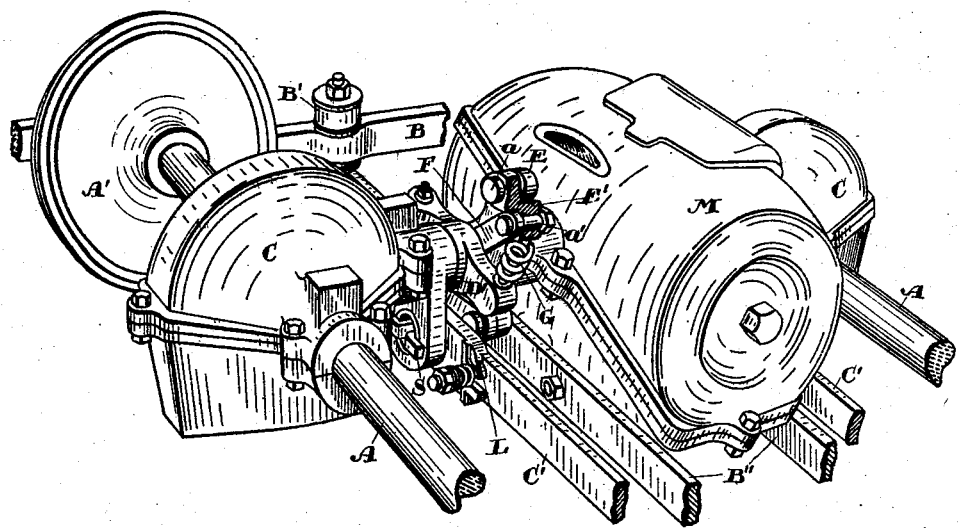
Figure 2:
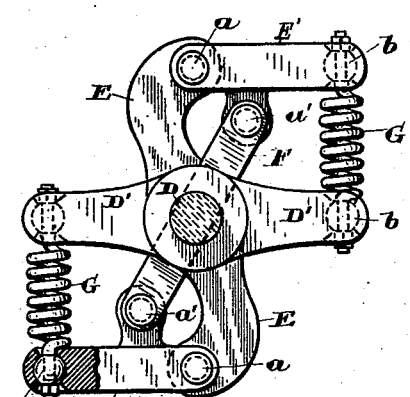
Figure 3:
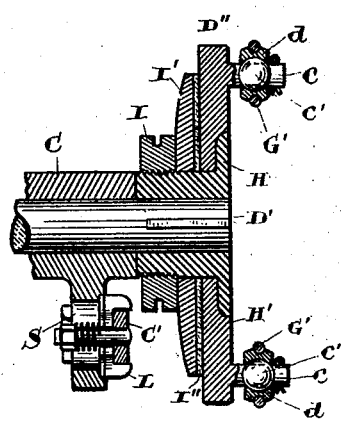
Figure 4:
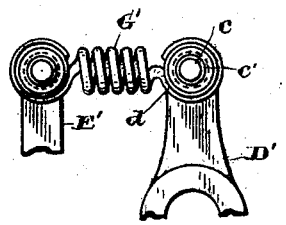

In the drawings, Figure 1 represents an isometrical view, partially in section, of a portion of the car truck, axle, and motor, showing one position or relative location of the coupling. Fig. 2 is an elevation of the coupling. Figs. 3 and 4 are details of the construction of the clutch or coupling.

Like letters of reference indicate similar parts throughout.

Referring now to Fig. 1, the axles A A are mounted upon the usual car-wheels, as A', and support the truck-frame B of any well-known form, which, through elastic or other support B', serves to secure the motor-supporting bar B'' in proper relation to the truck, the motor M resting upon the said motor-supporting bar B''. The power-driving connection between the axle and the motor may be by gear and pinion contained in housing C. The pinion-shaft D, Figs. 2 and 3, is supplied with a driving-arm D' or D'', (see Figs. 1, 2, and 3,) in the manner described in several applications previously filed. The gear-housings C C are supported upon the axles and receive additional support upon the bars B'' B'' or bars C' C', which are suitably supported by the truck B, a portion only of which is shown for the sake of clearness. The opposite end of the motor-shaft may be understood as being coupled to the other axle of the truck shown in the drawings, the clutch being hidden by the motor and a portion of the gear-housing C appearing to the right.

The necessity of the elastic or yielding portions of the clutch now to be described arises in part from the following consideration, namely, the slight tendency to acceleration and retardation in parts of each revolution of the clutch which may exist in some forms; furthermore, from the uneven action of one axle of the truck with reference to the other, especially on curves, and more particularly on that part of an abrupt curve where the leading axle has entered upon the curve and the other axle remains upon the straight track, the front end of the truck being swung bodily, compelling a slipping or angular movement of the back axle with reference to the alinement of the rails in the straight portion of the track. The necessity for this element of elasticity is also pointed out in my previous application, Serial No. 464,651, filed March 6, 1893, in which two forms of elastic medium are shown and described which serve to accomplish in part the functions of the present device.

To the motor are attached the driver-arms E E, (see Figs. 1 and 2,) to which are connected suitable links E' E' and which may be coupled by an equalizer F.

The joints at $a$ $a$ $a'$ $a'$ may be ordinary cylindrical bearings formed by pins protruding from one to the other or loose in each.

Connected to the pinion-shaft are driven arms D' D', which are attached to the free ends of the links E' E' by the links G G, constructed of an elastic medium, such, for instance, as a coiled spring, or any other method of obtaining elasticity or yielding action would serve the same purpose without departing from the spirit of the invention. Any style of joint may be used between the ends of these links, for instance, springs being flexible and attached directly to the links and arms, as shown in Fig. 1, or by means of an articulate joint of any form, as, for instance, ball and socket $b$, (shown in Fig. 2,) or the arms may have pins $c$, protruding from their sides, (see Fig. 3,) encircled by balls $c'$, around which a shroud $d$ extends, to which in turn a spring G', which constitutes the link, is attached.

In Fig. 2 the driving-arms D' are shown attached directly to the pinion-shaft D, but in Fig. 3 a slip-joint is employed located between the arms and the pinion-shaft D', which may be described as follows: The gear-casing C provides a journal for the shaft $a$, to which is keyed a screw-threaded flanged collar H. The nut I is secured upon the threads of such collar and serves to press a disk H', bearing the arms D'', against the flange by means of the washer I'. The leather or other insertion I'' may or may not be used. The pressure between the parts may be varied by the nut I in the well-known manner. The natural freedom and independence of the axles A with reference to the truck-frame are not impeded by the attachment of the gear-casing C with the supporting-bar C' or B'', inasmuch as a slipping joint is shown as between the parts L and the bar C', the former being connected with the casing C through a swivel, (shown at S, Figs. 1 and 3.)

The use and operation will be understood as follows:

The variation in pressures of torque and the other variations in alinement resulting from any of the well-known causes which may tend in different ways to throw undue strains upon the driving connection are neutralized by the elastic and yielding devices shown and described. The intermittent or sudden strains may be effectually neutralized by the elastic or yielding links G or G', and the undue strains of torque which are constant or tend to constantly increase or accumulate, when they pass a certain predetermined limit, are relieved by the friction device shown in Fig. 3. The differences in alinement are accounted for by the well-known action of the driving device as a whole, and certain of such differences, especially by the action of the ball or other articulate joints of the coupling. It will be understood that any other motor may be employed to drive the equipment, but when an electric motor is used the sudden tendency to inrush of current upon starting, or when, for instance, too much current is inadvertently thrown on to the motor, the motor tends to start up with a jerk, which not only unduly strains the mechanical portions of the motor and truck, but is disagreeable to the passengers. The slipping joint shown in Fig. 3 is especially useful in this connection to relieve the undue strains and allow the motor freedom of movement without it being transmitted to the gearing, not only giving a smooth start and relieving the portions from the strains described, but effectually cutting down such inrush of current.

It will be seen that the leather, fiber, or other disk I'' may be between the flange H and the disk H', and a washer I' may be upon either side thereof. A jam-nut may also be used, rubber cushions may be employed instead of the metallic springs G, or both the arms or links G and E' of the coupling may be elastic or yielding, or both links may be solid and the yielding or elastic medium located within the joint and consist in the insertions indicated by the balls $b\ b$, and many other variations in form of the devices described, and shown in the drawings, may be had without departing from the spirit of the invention.

I am aware that it is not new to use an automatic friction-clutch device to prevent delicate mechanism from being driven too fast, or to connect a driven shaft with its motor irrespective of the direction of the rotation of the motor, and such I do not claim. My slip-joint is not automatically released or tightened, but is set at a constant pressure, its object being to relieve an abnormal strain coming suddenly upon the driven shaft.

I am also aware that a slip-joint between a car-axle and one of the wheels thereon for the purpose of allowing the two wheels to rotate independently is not new; but my invention is for another purpose, to wit, to relieve sudden strains thrown upon a driven shaft through the medium of a flexible driving-gear, which, if no slipping joint were provided, might be injured or broken by some unusual strain.

Having described my invention, what I claim as new, and desire to secure by Letters Patent, is—

1. In a motor-truck, the combination with two revolving shafts, of cross-arms attached to said shafts, links connected to said arms and to each other, and comprising a resilient portion, and ball-and-socket joints at the junction of the links, substantially as described.

2. In a motor-truck, the combination with two revolving shafts, of cross-arms attached thereto, links jointed each to one end of a cross-arm, and adjacent links jointed to each other, one link in each pair being resilient, substantially as described.

3. In a motor-truck, the combination with two revolving shafts, of cross-arms attached thereto, links jointed to the ends of said arms, those on one arm being resilient and hung on a ball-and-socket joint uniting said links with those on the other arm, substantially as described.

4. In a motor-truck, the combination with two revolving shafts, of cross-arms attached thereto, links connecting the ends of said arms, and a slip-joint device between one of said arms and its shaft set to exert a constant pressure, substantially as described.

5. In a motor-truck, the combination with two revolving shafts, of cross-arms attached thereto, links connecting the ends of said arms, a slip-joint device between one of said arms and its shaft, and means for adjusting said slip-joint device to exert a constant pressure, substantially as described.

6. In a motor-truck, the combination with two revolving shafts, of cross-arms attached thereto, links connecting said arms, a flange on one of said shafts, against which the arm on said shaft bears, a washer bearing against said arm, and a nut for tightening the pressure of said washer, substantially as described.

7. In a motor-truck, the combination with a revolving shaft, of a cross-arm loose to revolve thereon, a flange against which the arm bears, a washer pressing against the arm, a packing of leather or the like between the washer and the arm, and a nut encircling the shaft and serving to tighten the washer against the arm, substantially as described.

8. In a flexible coupling for transmitting power, a link-coupling consisting of a resilient body provided at each end with a cast-metal ball-socket, and a ball inclosed in each socket, substantially as described.

ELMER A. SPERRY.

Witnesses:
FRANK H. GALE,
M. NIELSON.